US011199714B2

(12) United States Patent
Solomon

(10) Patent No.: US 11,199,714 B2
(45) Date of Patent: Dec. 14, 2021

(54) EXPERIMENTAL REALITY INTEGRATED SYSTEM

(71) Applicant: Dennis Solomon, Yarmouth Port, MA (US)

(72) Inventor: Dennis Solomon, Yarmouth Port, MA (US)

( * ) Notice: Subject to any disclaimer, the term of this patent is extended or adjusted under 35 U.S.C. 154(b) by 0 days.

(21) Appl. No.: 16/819,091

(22) Filed: Mar. 14, 2020

(65) Prior Publication Data

US 2020/0386997 A1    Dec. 10, 2020

Related U.S. Application Data

(63) Continuation-in-part of application No. 14/189,232, filed on Feb. 25, 2014, now Pat. No. 10,593,092, which is a continuation-in-part of application No. 16/190,044, filed on Feb. 13, 2018.

(51) Int. Cl.
| | | |
|---|---|---|
| *G02B 27/01* | (2006.01) | |
| *G06F 3/01* | (2006.01) | |
| *G06T 19/00* | (2011.01) | |
| *G06F 1/16* | (2006.01) | |

(52) U.S. Cl.
CPC ......... *G02B 27/0172* (2013.01); *G06F 1/163* (2013.01); *G06F 3/011* (2013.01); *G06T 19/006* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2007/0120974 A1* | 5/2007 | Chen | .................. | H04M 1/0214 |
| | | | | 348/61 |
| 2008/0036962 A1* | 2/2008 | Alitowski | ................ | G02C 5/08 |
| | | | | 351/63 |
| 2015/0219902 A1* | 8/2015 | Kim | ................... | G02B 27/0172 |
| | | | | 345/8 |
| 2016/0124500 A1* | 5/2016 | Lee | ........................ | G06F 1/1688 |
| | | | | 345/156 |
| 2018/0081325 A1* | 3/2018 | Oh | ......................... | G04G 19/00 |
| 2020/0192089 A1* | 6/2020 | Haddick | ................. | G06F 3/016 |

* cited by examiner

*Primary Examiner* — James A Thompson

(57) ABSTRACT

A transformative, collapsible, portable and versatile personal display system is disclosed having a compact, lightweight collapsible structure enabling applications from eyeglass form virtual, augmented, mixed or experimental reality to a comfortable, portable wristwatch form.

7 Claims, 18 Drawing Sheets

FIG. 1
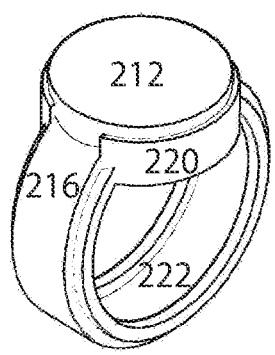
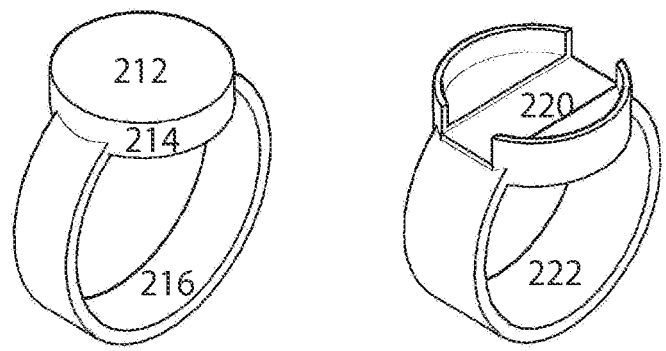

FIG. 2A
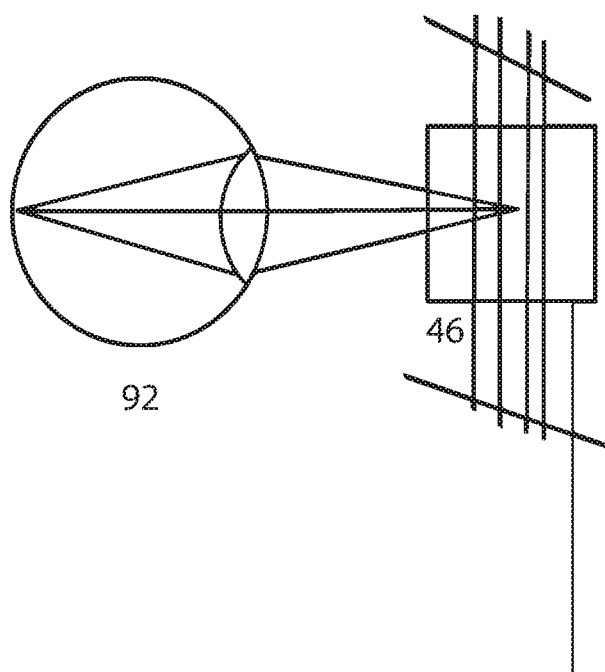
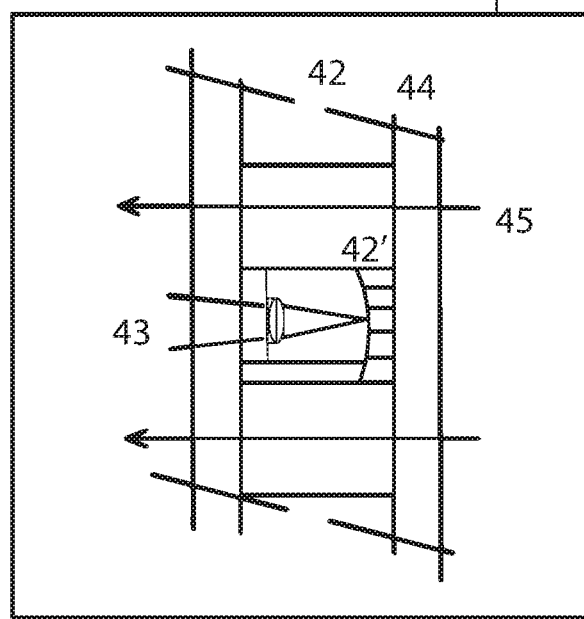

FIG. 2B
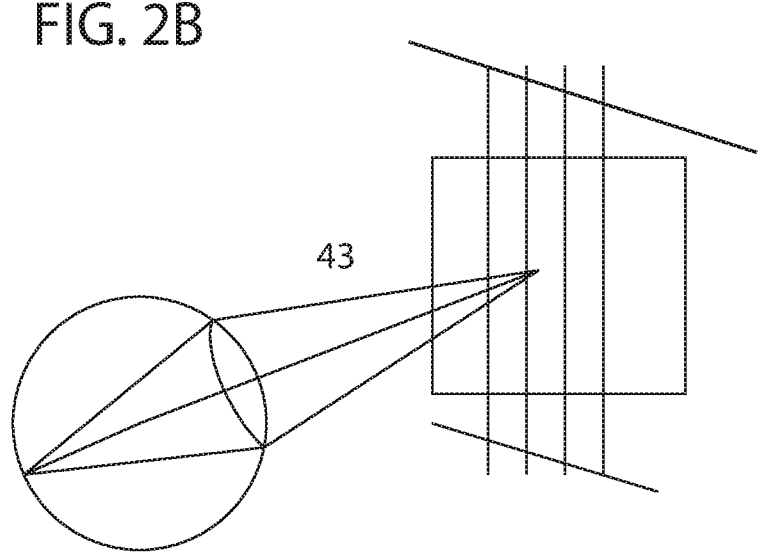
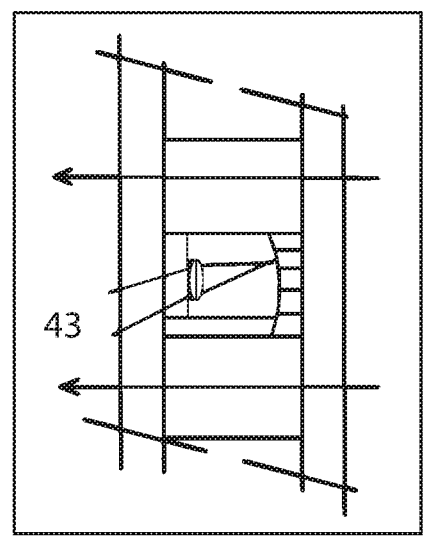

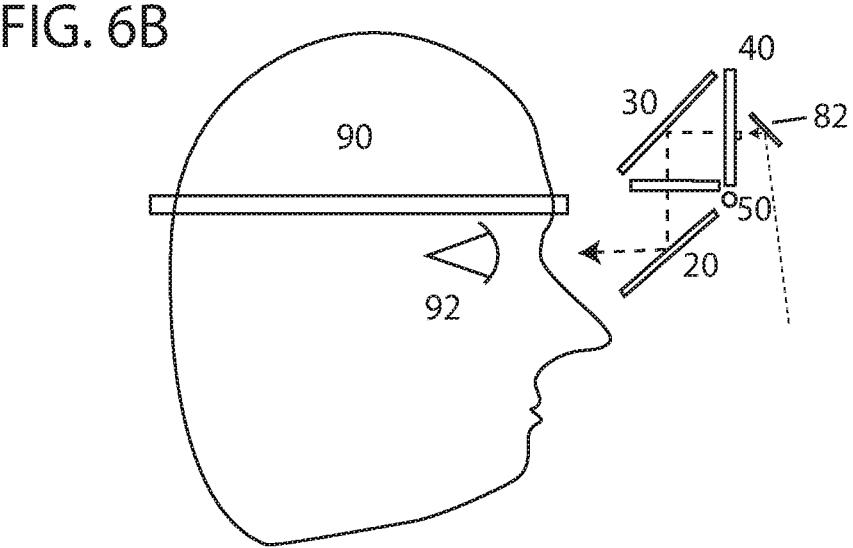

FIG. 11     From Parent App '044
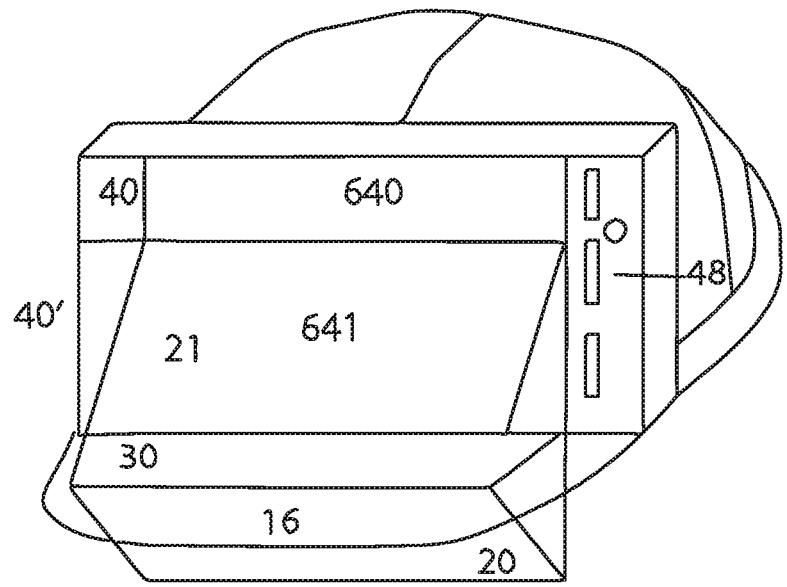
FIG. 12     From Parent App '044
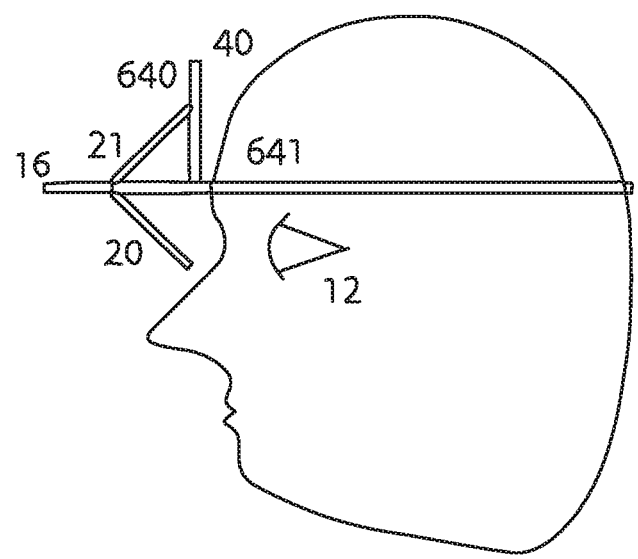

EXPERIMENTAL REALITY INTEGRATED SYSTEM

CROSS-REFERENCE TO RELATED APPLICATIONS

This continuation-in-part application claims the benefit of the earlier filing date and incorporates by reference in their entirety my related, pending and earlier-filed applications and disclosures including application Ser. No. 14/189,232, filed Feb. 25, 2014, currently pending and Ser. No. 16/190,044, filed Feb. 13, 2018, currently pending. The aforementioned filings are recorded in the submitted ADS.

TECHNICAL FIELD

The present invention related generally to experimental reality integrated systems which may include elements for creation, editing, monitoring and display of virtual, augmented and mixed reality manifestations for any application, purpose or industry.

BACKGROUND ART

Miniature displays are also well known and may involve a miniaturized version of planar or stereoscopic 3D technologies which display a distinct image to each eye. With increase miniaturization and incorporation into eyeglasses design, head-mounted displays (HMDs) have enjoyed an increasing popularity for applications ranging from fighter pilot helmet displays and endoscopic surgery to virtual reality games and augmented reality glasses. The 3D HMD display technology has numerous extensions including Near-to-Eye (NTD)—periscopes and tank sights; Heads-Up (HUD)—windshield and augmented reality—and immersive displays (IMD)—including CAVE, dome and theater size environments. The principal employed varies little from that of the 1930 Polaroid® stereo-glasses, or the barrier stereoscopic displays of the 1890s, despite extensive invention related to the active technology to produce each display has occurred over the past twenty years. As applied to small displays, these techniques evolved to include miniature liquid crystal, field emission, OLED, quantum dot and other two-dimensional matrix displays; variations of virtual screen and retinal scanning methodologies. These inventions have provided practical solutions to the problem of providing lightweight, high resolution displays but are limited to providing a stereoscopic view by means of image disparity.

It is also well known in the field that wavefront-based technologies, such as digital phase and diffractive holography, may at high-resolutions, convey a limited amount of accommodation data. However, their limitations including coherent effects, impart significant specular and other aberrations degrading performance and inducing observer fatigue.

Augmented reality had in origins at MIT Lincoln Laboratory in the 1960s and involved in a translucent HMD with head-orientation tracking in a wall projection immersive environment. The 'virtual image' in the HMD did not have accommodation, and the immersive environment did not include spatially-tracked, portable audience elements with multiplicative effects.

Despite the improvements during the past decades, the significant problem of providing a low cost, highly accurate visual display with full accommodation remains.

One of the principal limitations has been the inability of sequentially resonant or programmed variable focal length optics combined with scanning configurations to properly display solid three dimensional pixels, orthogonal to the scanning plane. Another limitation is the inability of the observer's eye to properly and comfortably focus on rapidly flashing elements. Numerous inventions have been proposed which have generally been too complicated to be reliable, too expensive to manufacture, without sufficient resolution, accuracy, stability to gain wide acceptance.

A further problem solved by the innovation of present invention is the method and apparatus to comfortably and useful carry and use an audio-visual display on one's person.

A further problem solved by the innovation of present invention is the method and apparatus to ergonomically, comfortably and useful carry and use an audio-visual display on one's person.

A further problem solved by the innovation of present invention is the method and apparatus to provide lightweight, optical components with high resolution and negligible chromatic aberrations.

A further problem solved by the innovation of present invention is the method and apparatus to provide lightweight, optical components with high resolution and negligible chromatic aberrations which may be transformed into a compact package;

A further problem solved by the innovation of present invention is to provide the method and apparatus which is lightweight, ergonomic, with high resolution and negligible chromatic aberrations, and which may be transformed into a compact package and integrated into an event or manifestation;

The present invention solves these and additional problems, particularly related to the portable multiphasic design, augmented reality, environmental dynamics and the accurate display of 3D pixels.

BRIEF SUMMARY OF THE INVENTION

The present invention discloses an integrated method and device for the creating, editing, monitoring, display and evaluation of an experimental reality environment, including the sophisticated monitoring of the user's physiological and psychological response.

Another object of the present invention is the display of a visual image in two or three dimensions including stereoscopic and/or visual accommodation, light field, beam holographic or diffractive. Another object of the present invention is an improved method and device for an immersive, augmented reality environment.

Another object of the present invention is an improved method and device for monitoring the physiological, psychological, fixation, processing, awareness and response of an individual.

Another object of the present invention is an improved method and device for constructing an accurate, augmented reality, visual display with automatic bi-ocular alignment, Another object of the present invention is an improved method and device for constructing an accurate, augmented reality, visual display without an intermediate image plane, Another object of the present invention is an improved method and device for manufacturing a visual display independent of coherence and wavefront curvature constraints, Another object of the present invention is an improved method and device for thin, wave-guided display.

Another object of the present invention is an improved method of presenting visual information, Another object of the present invention is an improved method and device for an immersive, augmented-virtual reality, experimental and/or audience performance environment.

Another object of the present invention is an improved method and device to present visual information in compact form unaffected by an external environment.

Another object of the present invention is an improved method and device to compactly wear upon one's person and transform into an immersive, augmented environment.

Another object of the present invention is an improved method and device to compactly wear upon one's person and transform into an immersive, augmented or virtual environment including a coordinated event manifestation and audience effects.

Another object of present invention relates generally to robotic, moving-light devices including those which illuminate and project data and images in visible and invisible wavelengths particularly to those used for theatre, stage, events, security and defense.

One object of the present invention is an improved luminaire, compact in size, lightweight, ad with a low moment of inertia.

Another object is 4π, continuous scan of the venue,

Another object is high efficiency, low cost, low maintenance design without electrical slip rings, split transformers or other devices to transfer base electrical power to a rotating optical element.

Another object is low moment of inertia of the rotating optical projection element.

Another object is lightweight and compact design.

BRIEF DESCRIPTION OF THE DRAWINGS

FIG. 1 shows a perspective view of a Wrist Base Station embodiment of the present invention.

FIG. 2A presents a side view of an direct center axis, illumination adjustment to a planar nanotechnology-embedded embodiment of the present invention.

FIG. 2B presents a side view of an off-center axis, illumination beam shift adjustment to a planar nanotechnology-embedded embodiment of the present invention.

FIG. 6B shows a side view of a game or trade show classical display embodiment of the present invention, wherein the scene visualization means includes a means to redirect the field of view from the orthogonal to an off-axis surface.

FIG. 9A shows a preferred method of and construction for enabling a divergent array of light beams to simulate a proximal display element.

FIG. 9B shows a preferred method of and construction for enabling a parallel beam of light to simulate a distal display element.

FIG. 11 shows a perspective view of a game or trade show embodiment of the present invention, wherein the display visualization means includes an external display area.

FIG. 12 shows a side view of a game or trade show embodiment of the present invention, wherein the display visualization means includes an external display area.

DETAILED DESCRIPTION OF THE PRESENT INVENTION

Figure 1A:
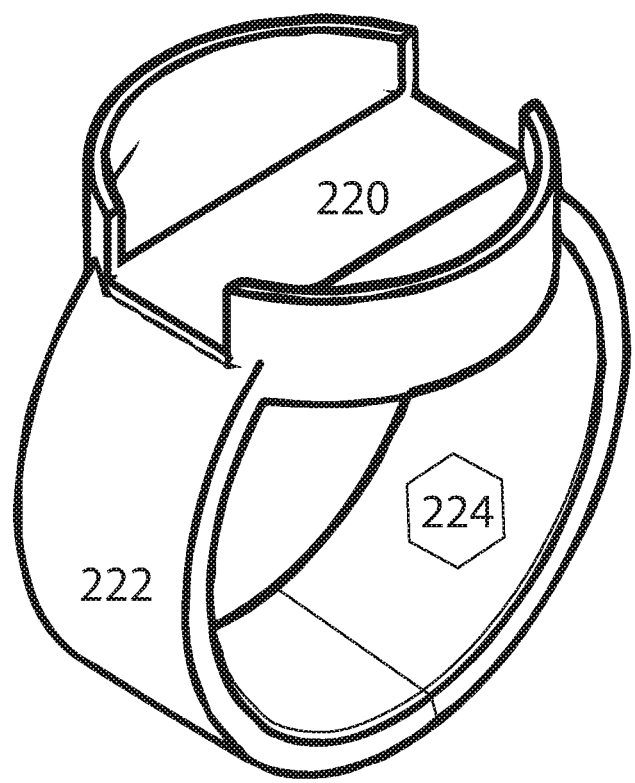
FIG. 1A shows a perspective view of a Base Station Element of the present invention.

In the following descriptions, the integrated headset device and system 10 may refer to a multiplicity of discrete elements (displays, cameras, touchscreens, computers, motion sensors, rf and optical communications, microphones, speakers, physiological sensors and other elements integrated into a functional structure. Unless specifically described, the descriptions, functions and references may also refer to a well-known "Smart Phone", manufactured by or marketed as an iPhone®, Samsung®, or others. The interactive embodiments of the present invention may be employed in manifestations of any sort to enable any effects or communication including but not limited to visual, audio streaming and interactivity.

((Base Station))

FIG. 1 shows a perspective view of a wrist base station embodiment of the present invention wherein the transformative display elements 212, 214 in the form of a wrist-watch-headset 216 may be removably affixed to base station element 220 which may be worn as a bracelet or watch 222. In operation, the base station, in addition to providing a secure location for storage of the transformative display 212 may house an additional charging battery; telecommunications, WiFi and other communications electronics; environmental and user physiology sensors; additional computational elements; and other elements. The base station 220 may communicate with the transformative display elements 212 by short range, low power communications including but not limited to Bluetooth, optical and acoustic means.

FIG. 1A shows a perspective view of a base station element 220 having an physiology sensor 224 on the wristband 222.

Figure 1B:
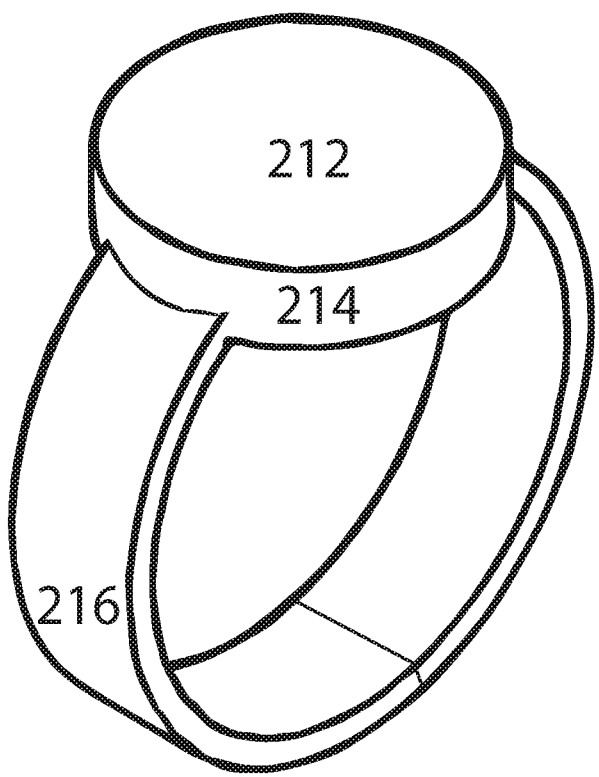
FIG. 1B shows a perspective view of a Transformative Display Element of the present invention.

FIG. 1B shows a perspective view of a transformative display element 212, 214 wherein the wristband or base station attaching arms 216 transform in the arms of the headset (eyeglasses).

((Nanotech Embedded Display))

Figure 2:
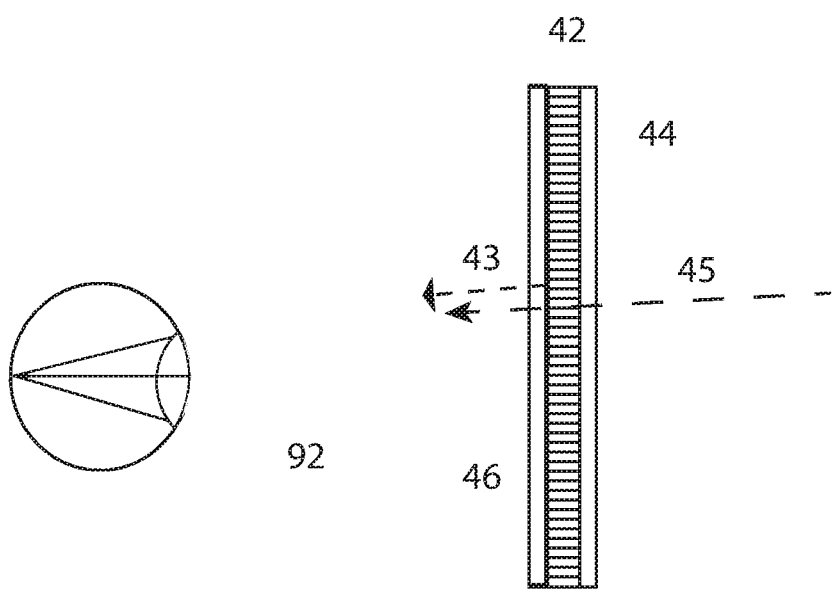
FIG. 2 presents a side view of a nanotechnology-embedded embodiment of the present invention.

FIG. 2 presents a side view of a nanotechnology-embedded display of the eyeglasses configuration wherein the display array 42 is comprised of light beam emitters 43 and optional transparent, see-through regions 45 with a transformative diffusion layer 46 enabling the display to function as a watch face and an occlusion layer 44 enabling the display of present invention to function as an immersive, fully occluded virtual reality display or a see-through augmented reality display having the ability to varying the background contrast 44. The diffusive layer 43 may be between the light emitter 43 and the user's eye 92

FIG. 2A presents a side view of a direct center axis, illumination adjustment to a planar nanotechnology-embedded embodiment whereby the displayed image is shifted in response to the rotation of the eye. The insert shows the fine structure of the light emitting cell 43 having a controlled one, two or three dimensional emitter array to shift the perceived image.

FIG. 2B presents a side view of an off-center axis, illumination beam shift adjustment to a planar nanotechnology-embedded embodiment of the present invention.

Figure 2C:
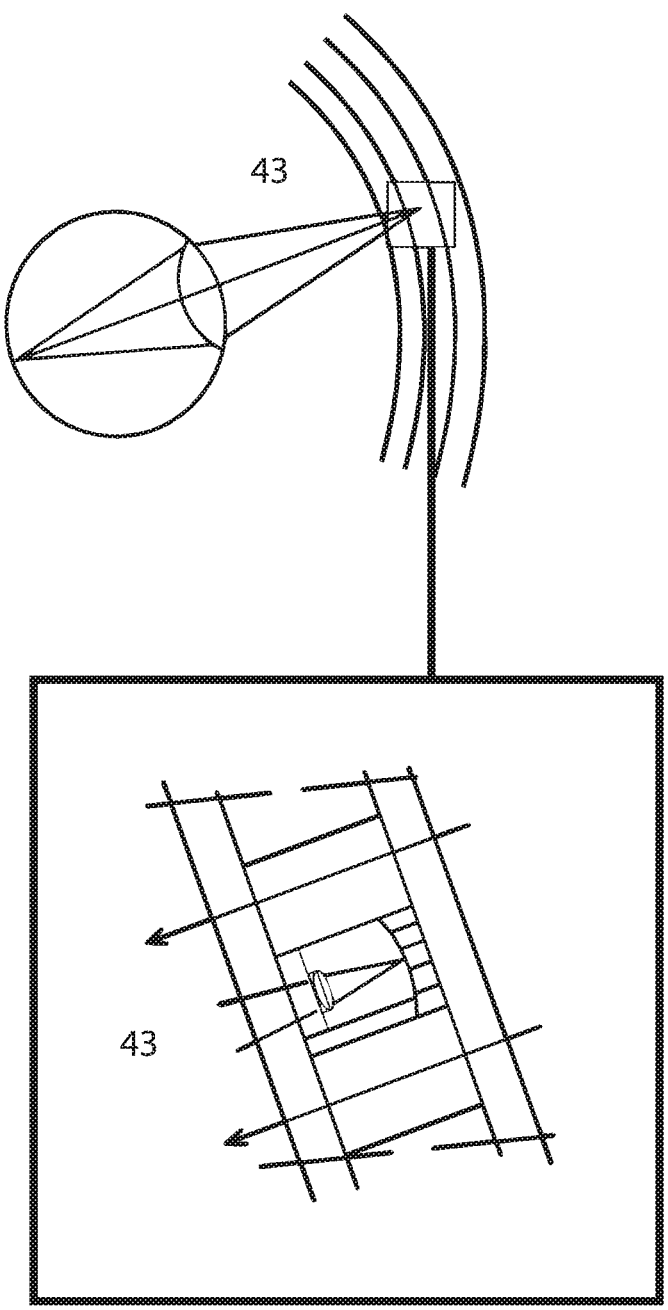
FIG. 2C presents a side view of an off-center axis, illumination beam shift adjustment to a curved nanotechnology-embedded embodiment of the present invention.

FIG. 2C presents a side view of an off-center axis, illumination beam shift adjustment to a curved nanotechnology-embedded embodiment of the present invention wherein a primary shift may be unnecessary.

((Flexible Wraparound Display Tech))

Figure 3:
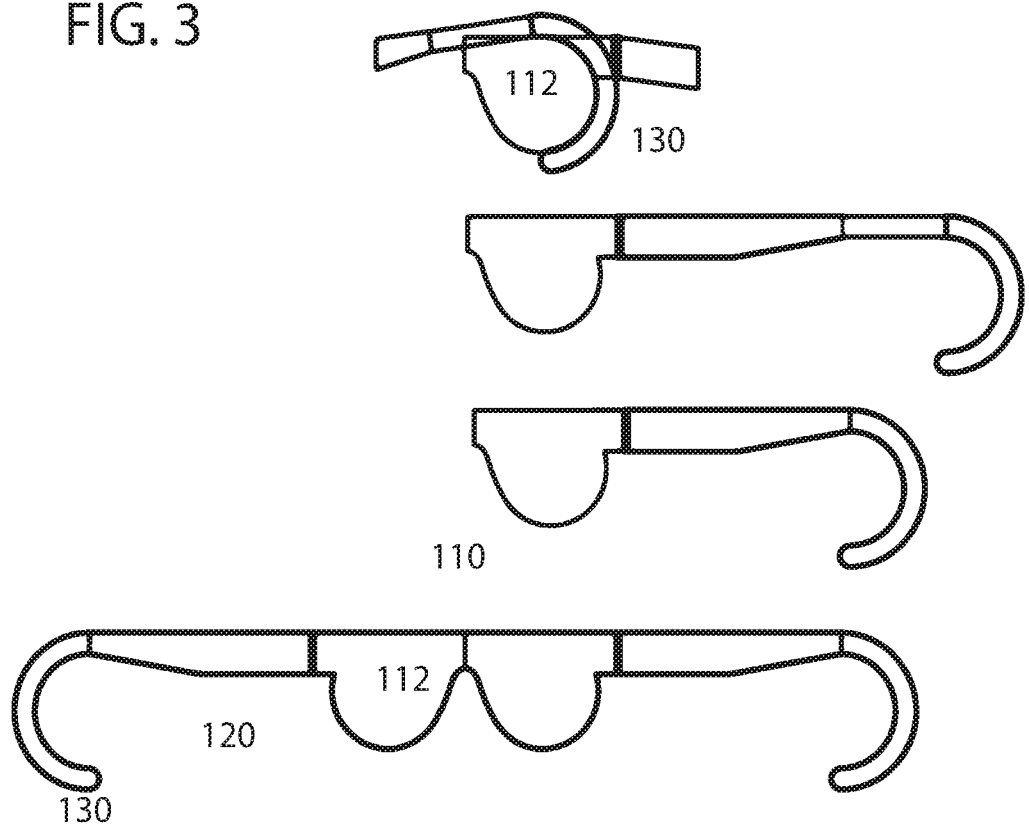
FIG. 3 shows a front view of flexible, transformative display embodiment in the four stage of transformation of the present invention.

FIG. 3 shows a front view of flexible, transformative display device 100 in the four stages of transformation of the present invention. The flexible frame 110 holds the eyeglass lenses 112 and extends to include the proximal arms 120. Extendable distal arms and ear pieces 130 may be adjustably affixed to the proximal arms 120 and frame 110.

In a preferred embodiment, the display device 100 folds about the nose bridge and adjusts the arms 120 to enable the earpieces 130 to removably affixed to secure the device 100 to the user's wrist or any other object.

In a preferred embodiment, the device 100 has a positive curl imparted in the frame which causes the device to roll up in its natural state. This configuration enables the frame 110 to natural wrap around a user's wrist or be expanded to present sufficient curl force to stably affixed to a user's head, supported in part by the nose bridge.

Figure 3A:
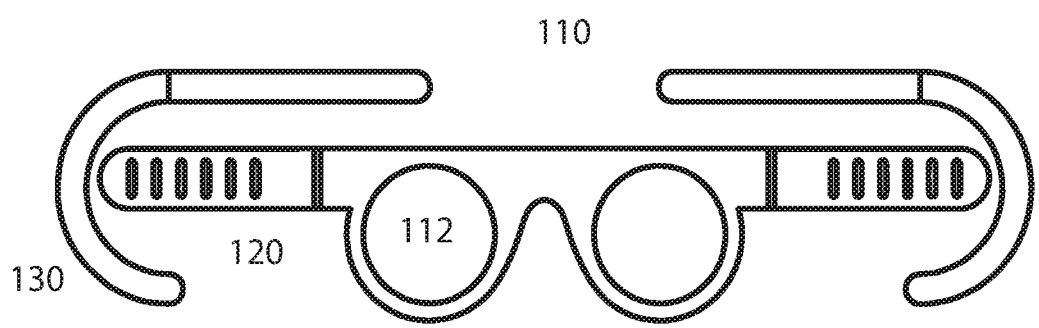
FIG. 3A shows a transformative eyeglass to watch display embodiment with adjustable arms of the present invention.

FIG. 3A shows a transformative eyeglass to watch display embodiment with adjustable two-part arms of the present invention having a multiplicity of slots and an insertable section.

Figure 3B:
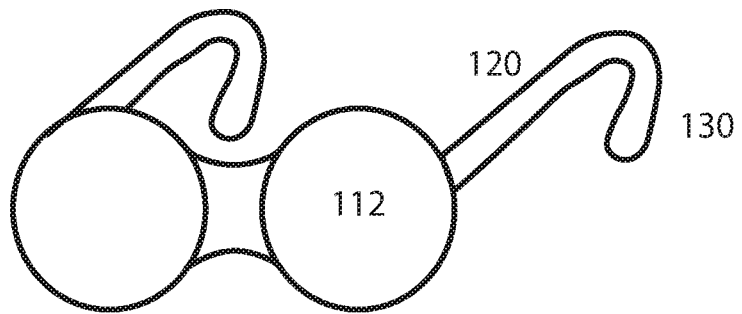
FIG. 3B shows a transformative eyeglass to watch display embodiment with elastic bridges and arms of the present invention.

FIG. 3B shows a transformative eyeglass to watch display embodiment with elastic bridges and arms of the present invention.

((Virtual Reality, Augmented Reality Embodiment))

Figure 4:
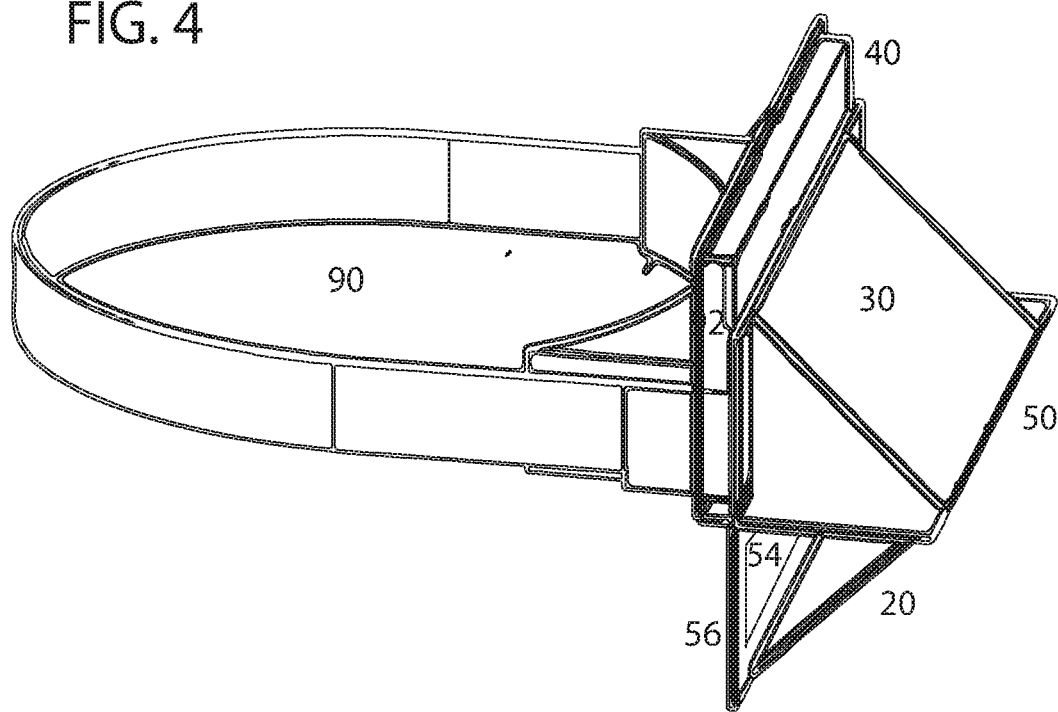
FIG. 4 shows a collapsible, fold-away virtual reality lens embodiment of the present invention, which may be employed in manifestations of any sort.

FIG. 4 shows a collapsible, fold-away, compactable, virtual reality lens embodiment of the present invention wherein virtual reality lens 54 may be movably affixed to a foldable VR Lens support 56.

In a preferred embodiment, the VR lenses 54 and support 56 may slide into a pocket behind the display 40 for storage or AR operation. In operation, the support 56 may removably affixed to the eye visor 20.

In another preferred embodiment, the VR lenses 54 and support 56 may movably and/or removably attached to the eye visor 20 and/or the device support 50. In operation for VR, the support 56 may removably but rigidly affixed to the eye visor 20 and the device support 50. When stored, the VR lenses 54 and support 56 may fold onto the eye visor 20 and both folded adjacent to the device support 50. In this configuration, the user's line-of-sight is direct.

Figure 4A:
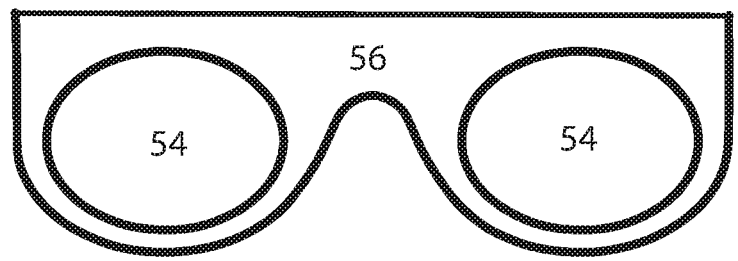
FIG. 4A shows a front view of collapsible, fold-away virtual reality lens elements of the present invention.

FIG. 4A shows a user's front view of a preferred embodiment for the VR support 56 and VR lenses 54.

These preferred embodiments may incorporate any or all of the features disclosed in the parent applications including but not limited to U.S. patent application '044.

((Collapsible Head Strap Feature))

Figure 5:
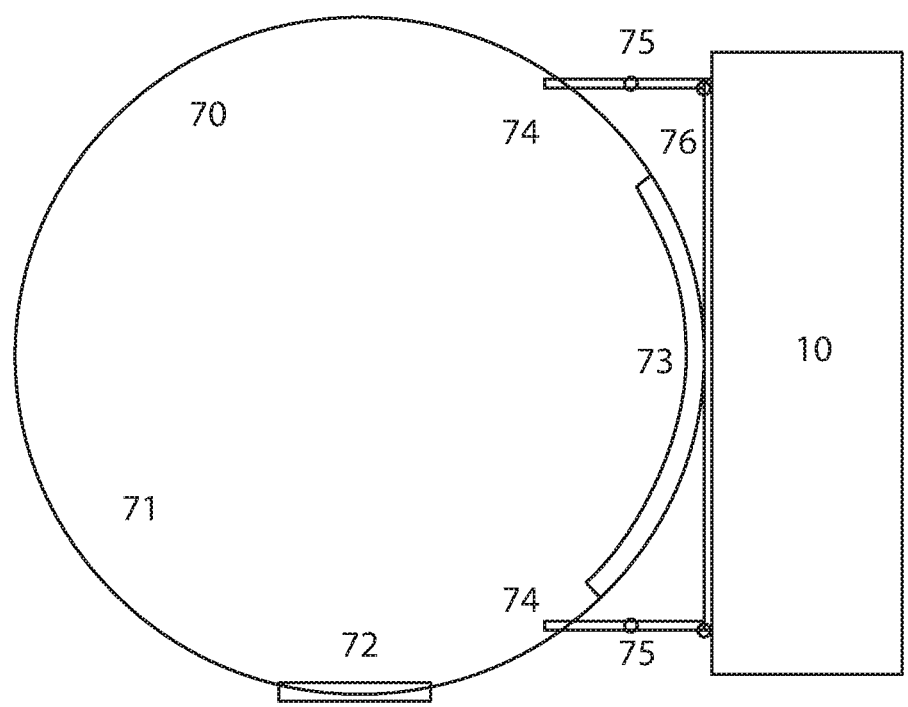
FIG. 5 shows a top view of a compact, collapsible, head Strap embodiment of the present invention.

FIG. 5 shows a top view of a compact, collapsible, head strap feature of the present invention wherein the head strap apparatus is comprised of a strap 71 which may be made of any material, rigid, flexible or elastic; an strap fit adjustment 72 and an optional pad and/or shield 73 which may include but is not limited RF attenuation and thermal management. The headstrap apparatus may be securely fitted to the user's head or other object and is securely affixed to the device support frame 76 through attachment element 74 and attachment arm 75. The attachment element 74 may be adjustable and pivotable so as to maintain a secure and rigid attachment between the user and the headset apparatus 10.

The attachment arm 75 may collapsible, hinged, elastic or of other construction to enable a rigid and stiff connection between the head strap 71 and the headset apparatus 10.

Figure 5A:
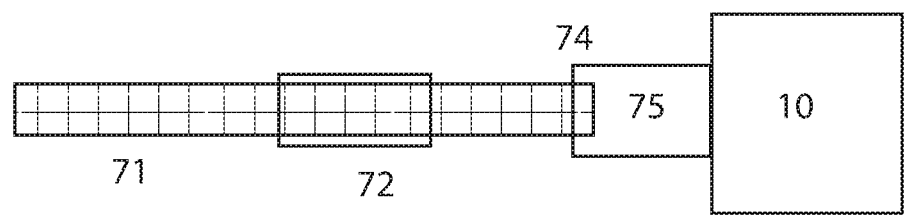
FIG. 5A shows a side view of a compact, collapsible, head Strap embodiment of the present invention.

FIG. 5A shows a side view of a compact, collapsible, head strap embodiment of the present invention. The attachment element 74 may be pivotable such that a counterbalancing force securely maintains the angular position of the headset apparatus 10.

((Game/Trade Show Variant of Ergo))

Figure 6:
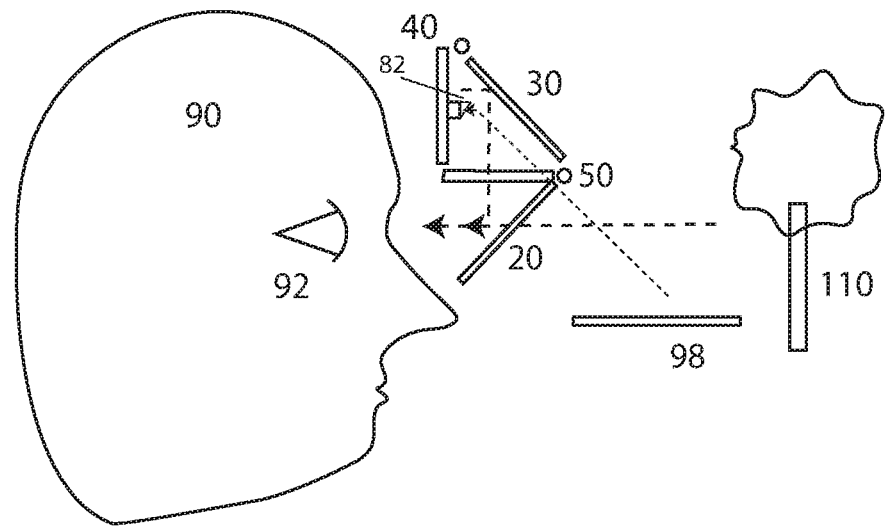
FIG. 6 shows a side view of a game or trade show embodiment of the present invention, wherein the scene visualization means includes a means to redirect the field of view from the orthogonal to a proximal floor.
Figure 6A:
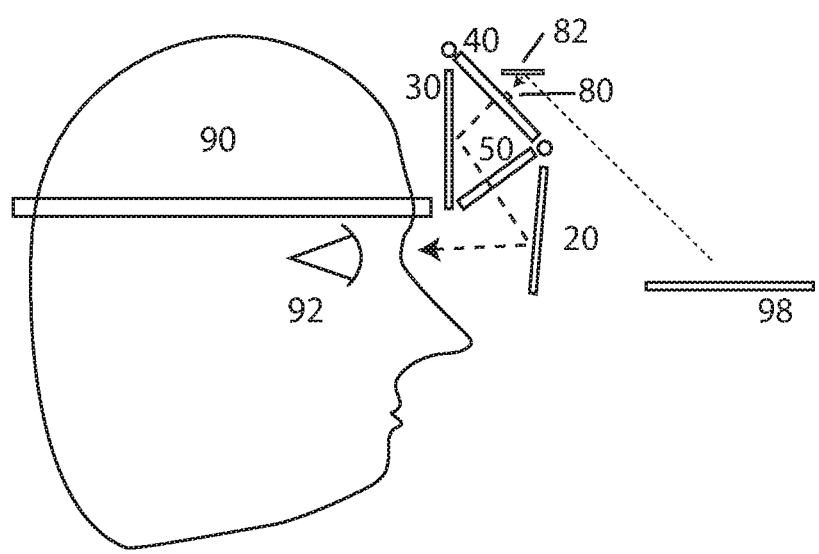
FIG. 6A shows a side view of a game or trade show ergo embodiment of the present invention, wherein the scene visualization means includes a means to redirect the field of view from the orthogonal to an off-axis surface.

FIG. 6 shows a side view of a game or trade show, ergonomic, front facing display embodiment of the headset device 10 wherein the scene visualization means 80 includes a means 82 to redirect the field of view from the orthogonal to a proximal floor 98. In a preferred ergonomic embodiment shown in FIG. 6, FIG. 6A shows a side view of a game or trade show ergonomic-rear camera embodiment of the present invention, wherein the scene visualization means includes a means to redirect the field of view from the orthogonal to an off-axis surface. The smartphone or display 40 faces the user 90 and the rear camera 80 is employed for external object recognition and other purposes.

FIG. 6B shows a side view of a game or trade show classical display embodiment of the present invention, wherein the scene visualization means includes a means to redirect the field of view from the orthogonal to an off-axis surface. The smartphone or display 40 faces the user 90 and is principally vertical in a manner compatible with current "Google Cardboard" applications. The rear camera 80 is employed for external object recognition and other purposes.

These preferred embodiments may incorporate any or all of the features disclosed in the parent applications including but not limited to U.S. patent application Ser. No. 16/190, 044.

((Name Tag Variant))

Figure 7:
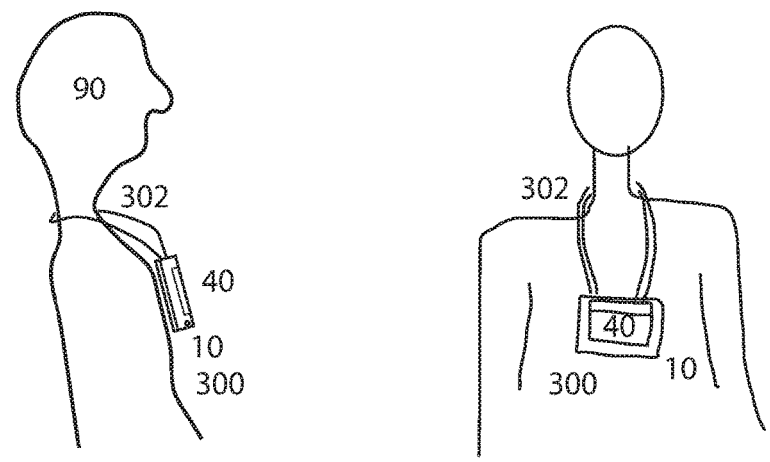
FIG. 7 shows side and front views of versatile Game-Trade Show Name Tag embodiment of the present invention.

FIG. 7 shows side and front views of versatile Name-Game Tag embodiment 300 of the present invention wherein the compact headset apparatus 10, Smart Phone or other similar display device may be employed as a name-game tag device providing information on the display 40 to the audience, front camera (Selfie) operation and monitoring and easy accessibility for the user 90. In its simplest form, the apparatus 300 is comprised of a paper holder for the smart phone and neck strap 302.

Figure 7A:
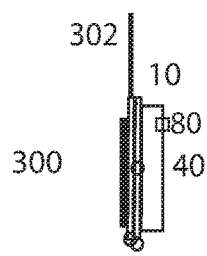
FIG. 7A shows the first view of a sequence of three side views of a preferred construction of the versatile Game-Trade Show Name Tag embodiment of the present invention transforming from compact to object view.

FIG. 7A shows the first of sequence of three, side views of a preferred construction of the versatile Game-Name Tag embodiment 300 of the present invention transforming from compact to object view. In operation, the apparatus 300 is comprised of a multiplicity of foldable members 310 which fold into a compact first configuration. The display 40 may face the user or the audience.

Figure 7B:
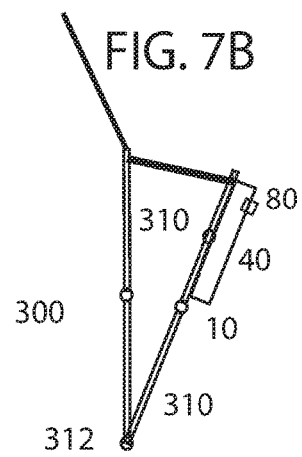
FIG. 7B shows a preferred construction of the versatile Game-Trade Show Name Tag embodiment of the present invention in its expanded configuration.

FIG. 7B shows a first expansion of the apparatus 300 wherein the display is facing the audience and the front 'selfie' camera is employed.

Figure 7C:
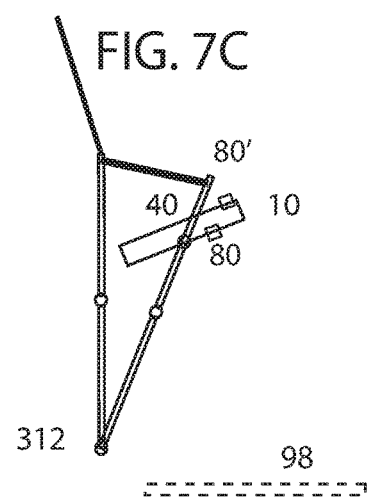
FIG. 7C shows a preferred construction of the versatile Game-Trade Show Name Tag embodiment of the present invention having a rotatable phone component.

FIG. 7C shows a second expansion of the apparatus 300 wherein the display 40 is pivoted and facing the user; the rear camera 80 may be employed in game, information and other activities and the front 'selfie' camera may be employed for personal communication, recording or other activities.

Figure 7D:
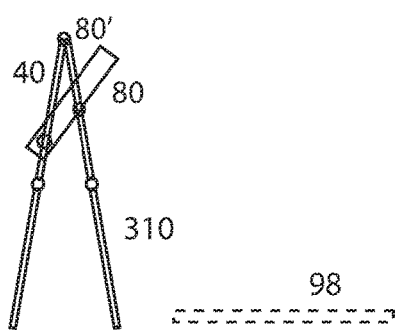
FIG. 7D shows a tabletop preferred construction of the versatile Game-Trade Show Name Tag embodiment of the present invention.

FIG. 7D shows a tabletop preferred construction of the versatile Game-Trade Show Name Tag embodiment 300 wherein the members 310 form a self-supporting structure for any use including but not limited to monitoring activities, playing an augmented reality game with a designed board 98, or security applications.

((Diffusive Overlay for Optical Data Signal))

Figure 8:
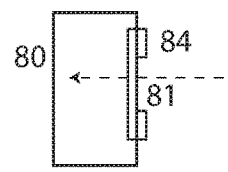
FIG. 8 shows a side view of the diffusive overlay to an image camera of the present invention for receiving an optical data signal.

FIG. 8 shows a side view of the diffusive overlay 84 to an image camera 80 of the present invention for receiving an optical data signal. The parent applications describe an audience effects system which projects a static or dynamic optical pattern, picture, array, video or other image upon an environment, audience, stage, building, room or other manifestation within which is embedded data or a data stream. The embedded data may be projected as invisible radiation (IR, UV, Acoustic, RF or other electromagnetic beam) or visible optical wavelengths wherein the temporal or spectral distribution encodes the data. Any protocol may be employed including but not limited to IRDA, Sony IR, RS232 and RLE.

The popular smart phone cameras may be employed in dual role: as a normal scene camera and as a data receiver. Normally, in order to receive a narrow data beam which may incident at any angle either the full frame must be analyzed. The process may be greatly simplified by dedicating part of the camera aperture, preferable in a plane of focus, to a diffusive or holographic filter which redirect part of the data beam to a dedicated region of the camera sensor. Thusly, the diffusive, translucent target in the field of view may be monitored for any beam characteristics (color, intensity and timing) of an external illuminating beam.

((Focal Distance by Divergence of the Emitted Beam of the Display Element))

Figure 9:
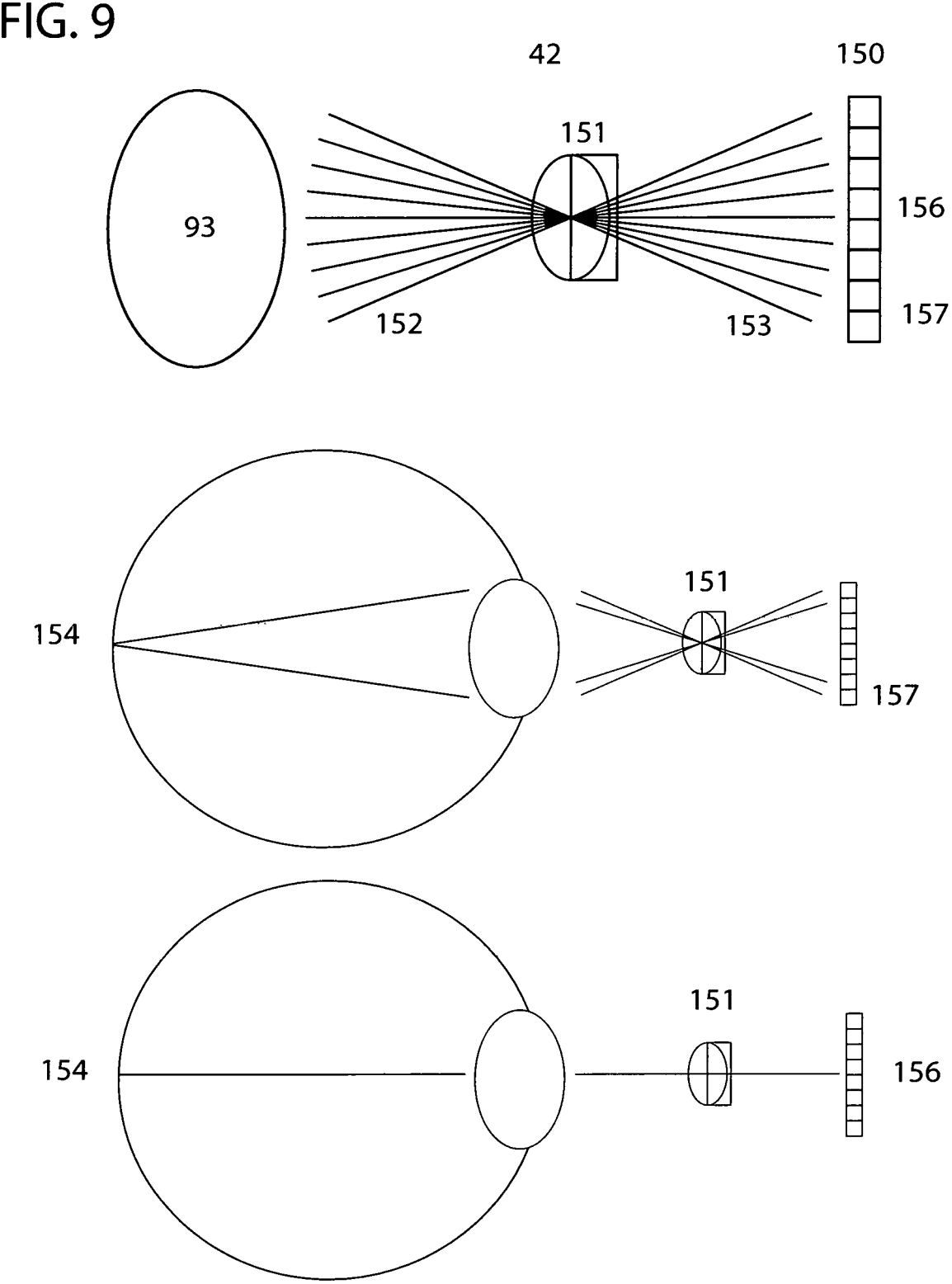
FIG. 9 shows a preferred method of and construction for varying the perceived focal distance of a display element of the present invention.

FIG. 9 shows a preferred method of and construction for varying the perceived focal distance of a display element of the present invention wherein the divergence of the light emissions from a given pixel 151 is adjusted by the simultaneous illumination of one or more light emitters 150, 156, 157 positioned about the principal optic axis of the emitter optics.

The perception of the distance of an object is determined by a number of factors including but not limited to the focal length of the lens of the eye; binocular convergence; image disparity; occlusion of or by other objects in the scene; relative size; relative or direction of the motion; color; and shading. The instantaneous focal length of the eye is in part determined by the divergence of the beam emitted from a resolvable, observable point source. The emitted beam may be of any form or combination including but not limited to conical or divaricated in one or multiple directions. For example, binocular emitter arrays, each pixel having a variable, horizontal divaricated form would enable the simultaneous projection of perceived focal distance (divergence), binocular convergence and image disparity.

FIG. 9A shows a preferred method of and construction for enabling a divergent array of light beams 157 to simulate a proximal display element. The response of the eye lens is enhancing by extinguishing the interior 156 nano-emitters 150.

FIG. 9B shows a preferred method of and construction for enabling a parallel beam of light 156 to simulate a distal display element.

((Construction Flip Up Eye-Optics))

Figure 10:
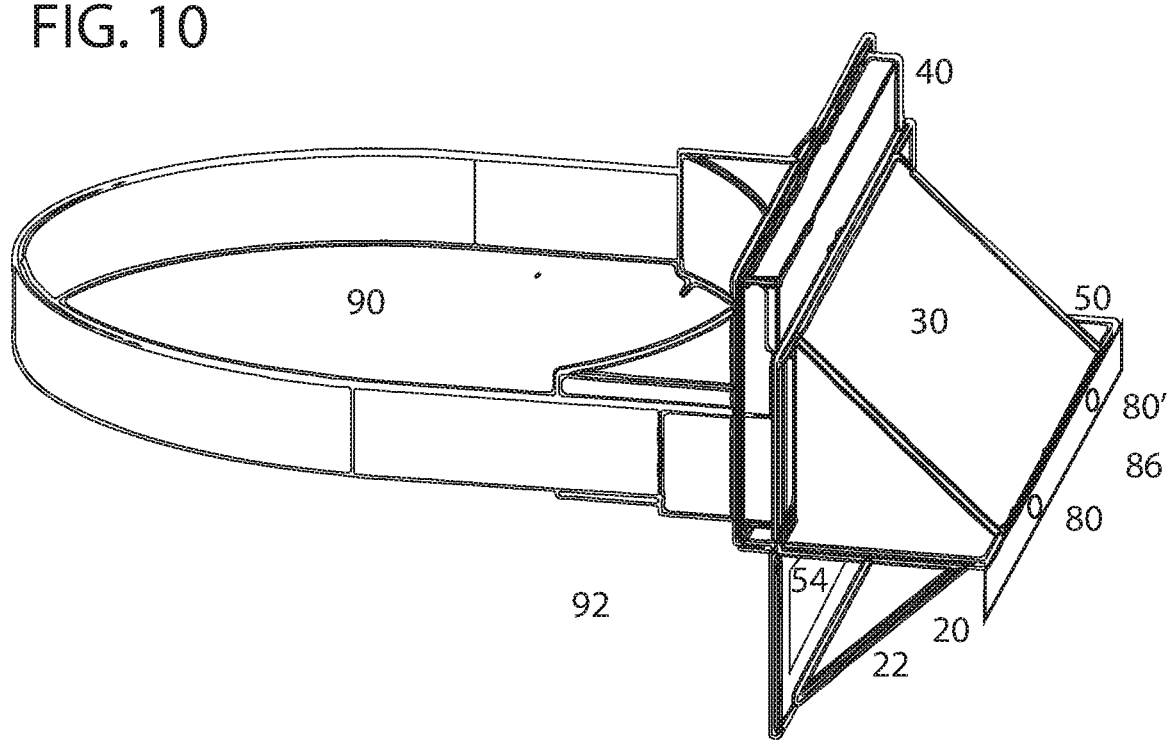
FIG. 10 presents an interactive embodiment of the present invention which may be employed in manifestations of any sort having the flip-up eye visor with mixed-reality cameras embodiment of the present invention.

FIG. 10 presents an interactive game-name embodiment which may be employed in manifestations of any sort and receive optical data signals of any sort having the flip-up eye visor 20 with optional VR lenses 54 and mixed-reality (MR) stereo cameras 80, 80'

((Ergo Name Tag Variant from App '044))

FIG. 11 shows a perspective view of a game or trade show embodiment of the present invention, wherein the display visualization means includes an external display area.

FIG. 12 shows a side view of a game or trade show embodiment of the present invention, wherein the display visualization means includes an external display area.

((Eye Sensors))

Figure 13:
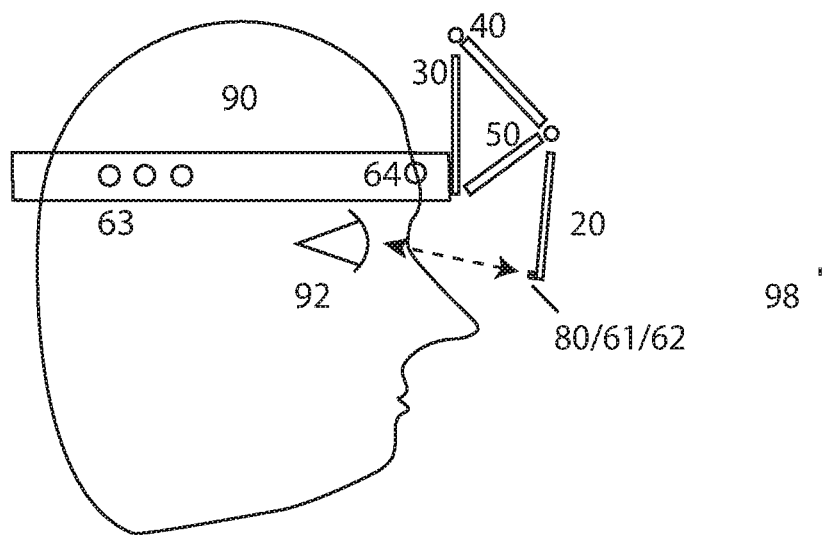
FIG. 13 shows a side view of a compact, foldable embodiment of the present invention exposing the smart phone display.

FIG. 13 presents an integration of multiplicity of sensors to monitor the physical and cognitive state of the user. Among, but not limited to, the sensors which may be integrated or removably attached are a eye state camera 80, illuminator 61, OCT, spectrometer or other eye or visual test apparatus 62; cognitive, neurophysiology or magno-electroneurophysiology sensors; and physiology sensors 64 such as body temperature, perspiration, heart rate, blood pressure and other parameters.

((Opera Designs))

Figure 14:
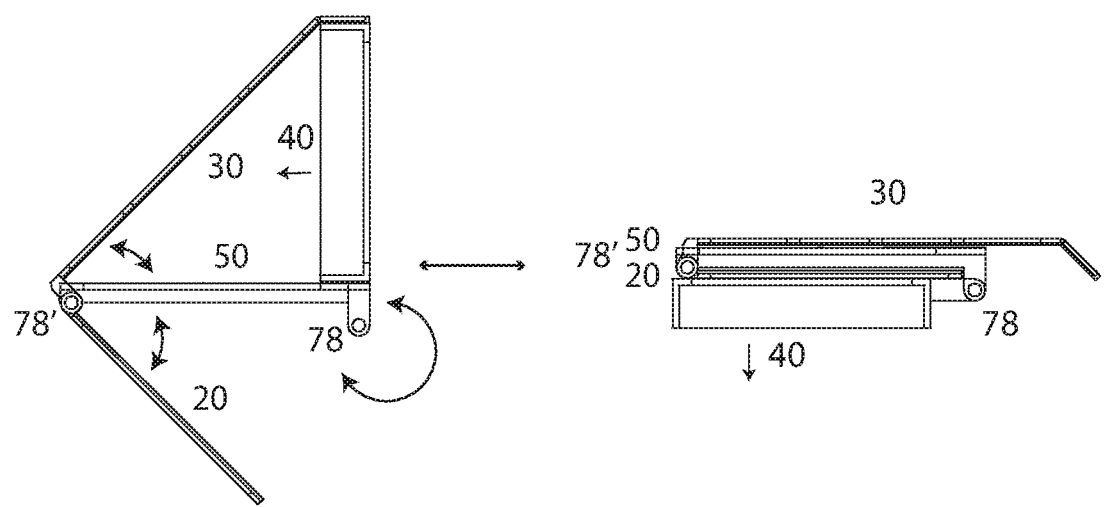
FIG. 14 shows an integration of sensors embodiment of the present invention

FIG. 14 shows a side view of a clam-shell, foldable embodiment of the present invention wherein the eye visor pivots 78' upward into a protected pocket in the lens support element 50 and the display (smart phone) 40 pivots 78 clockwise such that the display 40 remains visible (downward) to the user. The first mirror 30 pivots 78' clockwise protecting the inner optical surface in a recess of the lens support element 50. A virtual reality lens and support (not shown) may pivot 78 inside of the display 40.

Alternative configurations may be employed including but not limited to a snap-out, sliding and fold from a front pivot 78'. Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention.

Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only. Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings.

For example, aspects described in one embodiment may be 15 combined in any manner with aspects described in other embodiments. The invention may be embodied as a method, of which an example has been described. The acts performed as part of the method may be ordered in any suitable way.

Accordingly, embodiments may be constructed in which acts are performed in an order different than illustrated, which may include different acts than those which are described, and/or which may involve performing some acts simultaneously, even though the acts are shown as being performed sequentially in the embodiments specifically described above. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Element Numbers

| Description | Number |
|---|---|
| Integrated Transformative VR/AR/MR/XR Headset Display Device or Apparatus | 10 |
| Interaction, Audience, Actors, Event or Manifestation | 16 |
| Vision Mirror or Eye Visor | 20 |
| Flip-Up Visor Frame | 22 |
| First Mirror | 30 |
| Display / Smart Phone | 40 |
| NanoDisplay | 42 |
| NanoDisplay AR/XR/VR Light Beam | 43 |
| Occlusion Layer | 44 |
| External View Light Beam | 45 |
| Diffusion Layer | 46 |
| Lens Elements / Device Support | 50 |
| IntraMirror Lens | 52 |
| VR Lens | 54 |
| VR Lens Support | 56 |
| Eye Motion Sensor | 61 |
| OCT Eye Sensor | 62 |
| Physiology Sensor (Temp, Perspiration, etc. | 63 |
| Neurophysiology Sensor | 64 / |
| Head Strap Apparatus or Elements | 70 |
| Head Strap | 71 |
| Head Strap Adjustment | 72 |
| Optional Padding/RF, Thermal Element | 73 |
| Head Strap - Attachment Pointt | 74 |
| Attachment Arm / Stiff / Collapsible | 75 |
| Support Frame | 76 |
| Support Structure Pivot | 78 |
| Camera | 80 |
| Camera Lens | 81 |
| Camera Mirror | 82 |
| Camera Diffusive Overlay | 84 |
| Mixed Reality Stereo Cameras | 86 |
| User | 90 |
| Eye | 92 |
| Eye Lens | 93 |
| Object / Recognition Target / Game Board | 98 |
| EyeGlass Device | 100 |
| Eyeglass Frame | 110 |
| Eyeglass Lens | 112 / 114 |
| Eyeglass Arms / Temple | 120 / 122 |
| Eyeglass Arm Adjustable | 124 |
| Eyeglass Ear Piece | 130 / 132 |
| NanoDisplay | 42 |
| Nano Emitter | 150 |
| Nano Focus Lens | 151 |
| Eye Lens Incident Beams | 152 |
| Nano Emitted Beam | 153 |
| Retinal Focal Point | 154 |
| Far Emtter | 156 |
| Near Emitter | 157 |
| Variable Reflectivity Layer | 22 |
| Variable Occlusion Layer | 24 |
| Watch Embodiment | 200 |
| Watch Body | 210 |
| Watch Face | 212 |
| Watch Body - Folded Eyeglass Body | 214 |
| Watch Strap / Eyeglass Arms | 216 |
| Base Wrist Watch | 220 |
| Base Strap | 222 |
| Base Sensors | 224 |
| Name Tag - Game-Communicator | 300 |
| Body Strap or Other Body Attachment Means | 302 |
| Apparatus Members | 310 |
| Member pivots | 312 |

The invention claimed is:

1. A transformable, display system enabling the transformation from wristwatch form, support and operation to eyeglass form, support and operation; comprising:
   a. An articulated eyeglass frame and arms reversibly transformable into a wristwatch form;
   b. At least one visual display in the form of a wristwatch viewable at a normal wristwatch distance;
   c. At least one visual display in the form of an eyeglass lens viewable at a normal eyeglass lens distance;
   d. wherein at least one visual display operationally transforms between wristwatch and eyeglass lens viewable.

2. A transformable, display system in accordance with claim 1, further comprising:
   a. two visual displays in the form of an eyeglass lenses viewable at a normal eyeglass lens distance;
   b. wherein at least one visual display operationally transforms between wristwatch and eyeglass lens viewable.

3. A transformable, display system in accordance with claim 1, further comprising:
   a. An independent base station wristband element enabling the storage of the removable, transformable eyeglass frame and display elements.

4. A transformable, display system in accordance with claim 3, wherein said base station wristband element includes at least one of the following elements:
   a. A battery and circuitry to charge the removable eyeglass display elements;
   b. A transceiver element for external telecommunications;
   c. environmental sensors;
   d. user physiology sensors;
   e. additional computational elements.

5. A transformable display system in accordance with claim 1, having a transformable display element comprising:
   a. an array of having light beam emitter elements having focused beam divergence;
   b. said array overlayed by a transformative transmissive to diffusive layer enabling the display to reversibly function as a watch face.

6. A transformable, display system in accordance with claim 1, having a transformable display element comprising:
   a. an array of having light beam emitter elements having focused beam divergence intersperse with transparent; see-through regions of sufficient frequency to enable normal see-though vision;
   b. said array overlayed by a transformative transmissive to diffusive layer enabling the display to reversibly function as a watch face;
   c. and a reversible, external occlusion layer having at least one optical-occlusion controllable section enabling immersive virtual reality.

7. A transformable, display system in accordance with claim 1; further comprising:
   a. a foldable, eyeglass bridge component having an elastomeric composition; and
   b. a foldable, eyeglass arm components having an elastomeric composition.

\* \* \* \* \*